(12) United States Patent
Hahn et al.

(10) Patent No.: US 10,981,652 B2
(45) Date of Patent: Apr. 20, 2021

(54) PANELLING PART FOR A CABIN OF A MEANS OF TRANSPORTATION

(71) Applicant: Airbus Operations GmbH, Hamburg (DE)

(72) Inventors: Dennis Hahn, Hamburg (DE); Guido Kaiser, Hamburg (DE); Peter Linde, Hamburg (DE)

(73) Assignee: Airbus Operations GmbH

( * ) Notice: Subject to any disclaimer, the term of this patent is extended or adjusted under 35 U.S.C. 154(b) by 0 days.

(21) Appl. No.: 16/601,786

(22) Filed: Oct. 15, 2019

(65) Prior Publication Data

US 2020/0130839 A1    Apr. 30, 2020

(30) Foreign Application Priority Data

Oct. 30, 2018   (DE) ..................... 10 2018 127 044.5

(51) Int. Cl.
| | |
|---|---|
| *B64D 11/00* | (2006.01) |
| *B64D 45/00* | (2006.01) |
| *G06F 3/044* | (2006.01) |
| *G06F 3/041* | (2006.01) |
| *G09G 3/3225* | (2016.01) |
| *G09G 3/36* | (2006.01) |
| *H04B 1/3877* | (2015.01) |

(52) U.S. Cl.
CPC .......... *B64D 11/0015* (2013.01); *B64D 45/00* (2013.01); *G06F 3/0443* (2019.05); *G06F 3/04162* (2019.05); *G09G 3/3225* (2013.01); *G09G 3/3648* (2013.01); *H04B 1/3877* (2013.01); *B64D 2045/007* (2013.01); *B64D 2203/00* (2013.01); *G09G 2370/16* (2013.01); *G09G 2380/12* (2013.01)

(58) Field of Classification Search
None
See application file for complete search history.

(56) References Cited

U.S. PATENT DOCUMENTS

| | | | |
|---|---|---|---|
| 2009/0112638 A1* | 4/2009 | Kneller | .................. G06Q 10/00 705/5 |
| 2014/0085337 A1* | 3/2014 | Velten | ..................... G06F 3/017 345/635 |

(Continued)

FOREIGN PATENT DOCUMENTS

| | | |
|---|---|---|
| DE | 102006007283 A1 | 8/2007 |
| DE | 102006007285 A1 | 8/2007 |
| EP | 3157812 B1 | 5/2018 |

OTHER PUBLICATIONS

German Search Report for Application No. DE 10 2018 127 044.5 dated Jun. 27, 2019, 2 pages (p. 2 categorizing cited references).

*Primary Examiner* — Aneeta Yodichkas
(74) *Attorney, Agent, or Firm* — Lerner, David, Littenberg, Krumholz & Mentlik, LLP

(57) ABSTRACT

A panelling part for a cabin of a means of transportation is proposed, which includes at least one display unit and at least one control unit, which are produced by printing and equipping at least one film, which is applied to a panelling element. The control unit can communicate wirelessly with an external electronics unit, so that the panelling part only requires a power terminal to implement electronic functions. Functions can be retrofitted easily by replacing the at least one film.

15 Claims, 4 Drawing Sheets

(56) References Cited

U.S. PATENT DOCUMENTS

| | | | |
|---|---|---|---|
| 2015/0077337 A1* | 3/2015 | Coto-Lopez | G06F 3/017 |
| | | | 345/156 |
| 2015/0170604 A1 | 6/2015 | Iwagaki et al. | |
| 2019/0308728 A1* | 10/2019 | McKee | B64D 11/003 |

* cited by examiner

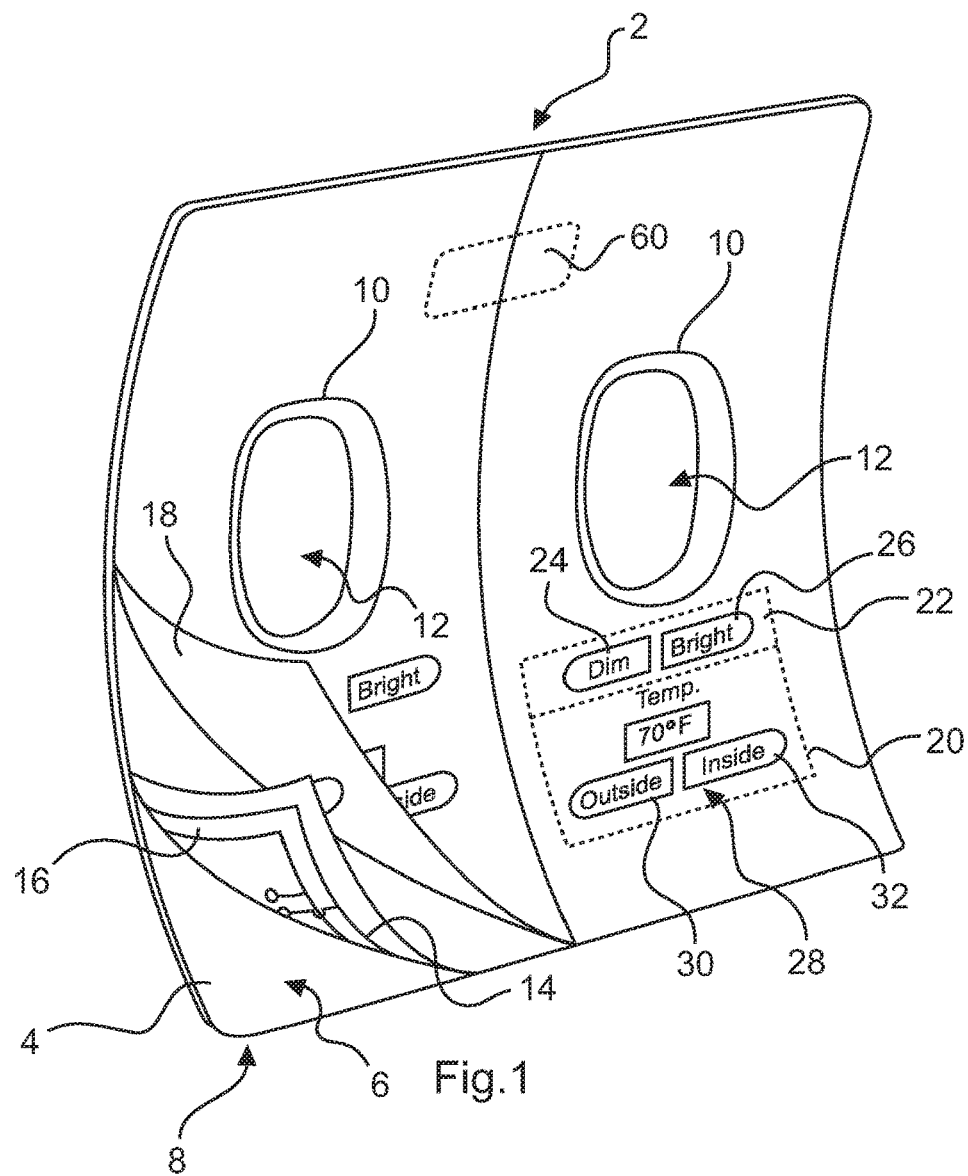
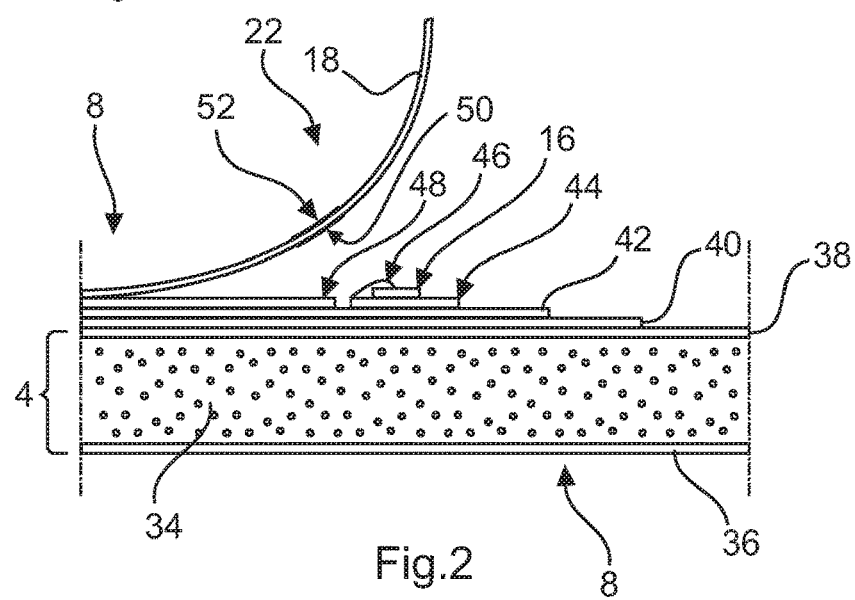

PANELLING PART FOR A CABIN OF A MEANS OF TRANSPORTATION

FIELD OF THE INVENTION

The invention relates to a panelling part for a cabin of a means of transportation and a means of transportation, in particular an aircraft, having a passenger cabin and a cabin panelling, which comprises at least one such panelling part.

BACKGROUND OF THE INVENTION

Passenger cabins of means of transportation are typically provided with internal panelling, which provides the walls of the cabin with an appealing exterior and protects insulation and electrical lines arranged thereon from mechanical action. Functions which are integrated into cabin components of a means of transportation are typically equipped with cables for power and data supply. In the case of larger means of transportation, such as commercial aircraft, however, this can mean a very high integration expenditure. Electrical lines have to be complexly produced and securely attached to the vehicle. The design, production, and testing of electrical lines can be accompanied by a significant time expenditure with increasing size of the means of transportation and an increasing number of electrical consumers.

In addition, for these reasons the planning of the functions to be implemented also has to be established very far ahead of time with respect to the actual implementation. An operator of the means of transportation is thus restricted in its flexibility, because short-term changes are only possible with very high expenditure.

BRIEF SUMMARY OF THE INVENTION

It would be desirable to be able to provide new or different functions in a cabin of a means of transportation at least in the region of panelling elements of the cabin, without having to implement complex wiring, so that easy and rapid modification of a plan or an already partially implemented embodiment can be carried out. At the same time, the lowest possible weight would be implemented. This can have an effect on the cost effectiveness of a commercial aircraft in particular.

Aspects of the invention may provide alternative panelling elements for a cabin of a means of transportation, using which the cabin can be panelled at least in regions, wherein display functions can be provided in particular therein. The alternative panelling elements are to be accompanied in particular by a low weight, require a lesser mechanical and technical complexity of the display functions, and furthermore facilitate the subsequent modification.

A panelling part for a cabin of a means of transportation is proposed, the panelling part comprising a shell-type panelling element having a cabin side and an outer side, at least one display unit, at least one film, and at least one control unit, wherein the display unit is arranged on the panelling element and is designed to display items of image information to a user facing toward the cabin side, wherein the at least one film is fastened on the cabin side, wherein the at least one film comprises conductor tracks, which extend from a peripheral terminal section of the at least one film to at least one connecting section, at which a power terminal of the at least one display unit is connected to the conductor tracks, and wherein the at least one control unit is fastened on the at least one film, is at least coupled to the at least one display unit, and is designed to communicate wirelessly with an electronics unit located outside the panelling element and to provide items of image information for display on the at least one display unit.

The panelling part according to an embodiment of the invention can therefore also provide, in addition to the actual function of the panelling, a display unit, using which items of image information can be displayed in the cabin of the relevant means of transportation. The items of image information are not necessarily to be understood as high-resolution moving or stationary images. Rather, it is conceivable in a particularly simple embodiment that the display unit solely displays one or more illuminated symbols, which are intended for the information of users.

The display unit is arranged on the panelling element, so that the user facing toward the panelling part can receive the corresponding items of image information. The display unit does not necessarily have to be arranged in a cut-out of the panelling element in this case, but rather can be located on the cabin side as a very flat structure. The at least one display unit is moreover to be adapted to the shape of the panelling element, so that not only a harmonic external appearance is achieved, but rather also image contents are always provided at a constant distance in relation to the panelling element and are sufficiently well recognizable.

One particular advantage is the use of the at least one film, which is fastened on the panelling element. The at least one film comprises in this case, for example, a film printed with conductor tracks. It can furthermore comprise a film provided with additional electronic components, wherein the electronic components can comprise, inter alia, semiconductors, capacitive and inductive components, and also integrated circuits. Moreover, antenna arrangements and coil arrangements are also conceivable. The at least one control unit can therefore be placed as an integrated circuit directly on a film, in order to communicate via conductor tracks with other components arranged on the panelling element and fulfil desired tasks.

External control units and conventional cables, which comprise individual insulated leads, can be replaced by correspondingly equipped films. This results in significant weight advantages and easy replaceability of all of the equipment of a panelling part.

The terminal section is used to establish a connection to a vehicle power supply. The at least one connecting section can also be spaced apart from an edge of the at least one film and can establish a connection to a control unit arranged on the at least one film and/or the display unit.

The film can consist of a plastic material, for example, polyethylene terephthalate (PET) or of polycarbonate. This material is flexible, resistant, and cost-effective. It may be used at a very low thickness of, for example, approximately 200 µm for this intended application. The conductor tracks can be applied with the aid of a conductive material at the provided points.

Such a design can furthermore result in a simplified and significantly accelerated individualization of a cabin. An automated process could be used to conceive the layout of the at least one film and to produce it directly by way of one or more printing units. An individualization of the cabin, with respect to the functions in panelling elements, can therefore take place very rapidly and in a late stage of the production of the relevant means of transportation. A later modification can furthermore be performed by replacing the at least one film, which is also rapidly producible.

The panelling part moreover enables complete independence from wired data lines by way of the wireless communication with the at least one control unit integrated in the at least one film. The functions of the display unit can therefore be provided without requiring a complex vehicle-side arrangement of data lines, which is cost-intensive to produce, to test, and to integrate. The individualization of the functions and the layout of the at least one film can also be further accelerated in that no modifications are required on the vehicle side even in the event of a replacement of the equipment film. The at least one control unit and the at least one display unit are solely provided with an operating voltage by the conductor tracks. External data can be retrieved by the communication with the external electronics unit to supply the required data to the at least one display unit. The equipped panelling element can therefore represent a completely independent unit, which is to be supplied solely with an operating voltage in a wired manner and is to be installed in the cabin of the means of transportation and connected to a power supply as a whole.

The panelling part can furthermore comprise at least one interaction unit coupled to the at least one control unit, wherein the interaction unit is arranged on the panelling element and is designed to receive inputs of a user facing toward the panelling part and wherein the at least one control unit is designed to provide the items of image information in dependence on inputs of the interaction unit. The interaction unit can be implemented by various measures. On the one hand, it is conceivable to provide actual actuating means in the form of mechanical buttons, switches, or the like. However, this could always require a modification of the panelling element if additional functions are to be provided. On the other hand, the interaction unit could comprise touch-sensitive input means, which are implemented, for example, in the form of touch-sensitive surfaces on the panelling element. The touch-sensitive surfaces can be identified by a specific colouration or a corresponding imprint on one of the at least one film. It is also conceivable to provide an individual display unit or a subregion of a larger display unit for each input means or for multiple input means simultaneously, in which a function of the relevant touch-sensitive surface is indicated. It is conceivable to arrange capacitive touch-sensitive sensors on the equipment film, which are arranged in front of or behind the relevant display unit. It is furthermore conceivable to already equip the at least one film with a type of display unit, which is overlaid using the touch-sensitive sensors or vice versa. The display unit could be in each case a lighting unit, could comprise a matrix of lighting units, or a display screen, which is based, for example, on OLED or a backlit TFT active matrix. The display unit could furthermore change its luminosity, its colour, a displayed symbol or image upon actuation of the corresponding input means, so that the user is made aware that the input means is actuated.

The panelling element could be an at least regionally curved lateral panelling element for panelling a lateral surface of the cabin. The equipment of the panelling element with at least one film can enable the large-area integration of different functions directly on lateral surfaces of the cabin facing toward passenger seats. For example, display units could be used which each replace or supplement a cabin window. Interaction means in the form of touch-sensitive surfaces for dimming and switching on and off such a display unit are advantageous. With progressing technological development, an integration of a flexible display screen is conceivable, which is integrated directly into the at least one film or is bonded flatly thereon. The concept of the use of one or more films which are separable from the panelling element and easily replaceable can result in rapid retrofitting. In particular, it is conceivable that due to a continuous refinement, at a later point in time in particular the at least one display unit can be reduced in its weight, which increases the cost-effectiveness of the means of transportation in particular in the case of a commercial aircraft. Since the essential electronic functions are implemented by the at least one control unit, in particular to implement new functions for passengers, only the replacement of the at least one film is necessary during a maintenance of the means of transportation.

In one advantageous embodiment, the at least one display unit comprises a matrix display, which replaces a cabin window. The at least one display unit can therefore be dimensioned at least equal in size to a conventional cabin window. For example, the at least one display unit could have a size of 30×40 cm or larger. It is to be particularly emphasized that with such a design, the construction of the fuselage of the means of transportation is significantly simplified mechanically. Moreover, the structure of the lateral panelling can be simpler, because a window funnel is not necessary. The shape of the panelling element could therefore correspond to a cut-out of a cylindrical lateral surface. To provide an improved sense of space, it is conceivable to embody the at least one display unit significantly larger than a conventional cabin window. In general, using a matrix display having the flattest possible structure is advantageous. Energy-saving displays can be implemented, for example, using OLED, while other display units based on TFT technology could also be implemented, however. The at least one control unit could be designed to output items of image information, which originate from a camera, for example, on the at least one display unit.

In one advantageous embodiment, the conductor tracks and the at least one control unit are arranged on a side of the at least one film facing toward the panelling element. The structure of the at least one film having the components and/or conductor tracks arranged thereon is very flat. To nonetheless avoid irregularities caused by conductor tracks and other components on the side of the at least one film facing toward the user, it is conceivable to arrange the at least one film with the aid of a foamed adhesive on the panelling element. The at least one film can therefore be placed having a smooth outer surface by way of rolls, rollers, or similar aids, wherein then the fine irregularities are compensated for by the foamed adhesive.

In one advantageous embodiment, the at least one film comprises a decorative film, which is arranged as the outermost layer on the panelling part. The decorative film thus provides the visible surface on the panelling part. It can assume a protective function and could have a greater material thickness than films lying underneath. To make the image contents displayed by the at least one display unit visible to a user, the decorative film can comprise a transparent region adapted to the relevant display unit, behind which the display unit is placed. It is conceivable that all regions of the decorative film which are not arranged in front of a display unit are provided with a coating. The coating can in particular comprise a colour layer. The coating can furthermore produce a desired surface structure, which improves the haptics of the panelling part.

Preferably, one or more symbols or markings are arranged on the decorative film, which align with the respective interaction unit, for the at least one interaction unit. Due to the simple use of a decorative film, positions of interaction units can be marked very easily on the side of the panelling part facing toward the user. The decorative film can be formed and printed at the same time with other films located underneath. The replacement of these films can be accompanied by the replacement of the decorative film.

In one embodiment, the panelling element is an inner wall panelling element, wherein the at least one display unit comprises a status display for at least one onboard toilet. Such an embodiment of the panelling part is suitable in particular for use above an aisle in the cabin of the means for transportation. The structure is significantly simpler than for similar displays from the prior art. These additionally have a significantly greater structural depth and a higher weight. Items of status information of onboard toilets can be displayed, as well as no smoking symbols and the like. An item of information can be transmitted from the relevant external electronics unit to the panelling part by the at least one control unit integrated into the panelling part, which is then displayed in the panelling part. Such panelling parts can replace conventional displays and can be easily retrofitted.

The at least one display unit could comprise at least one light-emitting diode arranged on the at least one film. It can furthermore suggest itself to also use a matrix of light-emitting diodes which is arranged on the at least one film. Relatively large-area symbols could thus also be illuminated, which are recognizable over greater distances in the cabin. The decorative film could then comprise the actual symbols which are illuminated by the at least one light-emitting diode.

The panelling part can furthermore comprise a charging cradle for accommodating mobile terminals, wherein the charging cradle is designed to carry out an electrical coupling with the accommodated mobile terminal. Such a charging cradle could be provided, for example, with a coil arrangement, which inductively supplies the mobile terminal with an electric voltage. For this purpose, the at least one film can be provided with a control unit, which is coupled to the coil arrangement. The control unit can be used to carry out a transmission of electric power according to the QI standard or the like. The control unit can be a dedicated control unit or can be integrated as a function into another control unit arranged on the equipment film.

The panelling part can be a panelling part for a side wall of a cabin. Furthermore, the panelling part can also be a panelling part for a cabin monument. Such a cabin monument can be a kitchen (galley), a washroom, a storage compartment, or combinations thereof. Furthermore, the panelling part can also be a panelling part of a partition wall or can at least partially form such a partition wall. Such a partition wall can separate cabin regions from one another in a cabin of the vehicle, for example.

The invention furthermore relates to a method for producing an above-described panelling part, comprising the steps of providing the shell-type panelling element, providing the at least one film, printing the at least one film with conductor tracks to form a peripheral terminal section and at least one connecting section, equipping the at least one film at least with the at least one control unit, which is coupled to the conductor tracks, and attaching the at least one film to the cabin side of the panelling element.

The method can furthermore comprise equipping the at least one film with at least one interaction unit, which is coupled to the at least one control unit.

Preferably the method furthermore comprises the preparatory step of automated design of a course of the conductor tracks and of the location of the at least one connecting section with the aid of a computer unit. The printing and the equipping with the aid of at least one printing device and an equipping robot can follow thereon.

The invention furthermore relates to a means of transportation, comprising a passenger cabin which is provided with cabin panelling, wherein the cabin panelling is embodied as at least one panelling part according to the above description.

The means of transportation could be embodied as an aircraft.

BRIEF DESCRIPTION OF THE DRAWINGS

Further features, advantages, and possible applications of the present invention result from the following description of the exemplary embodiments and the figures. In this case, all features which are described and/or illustrated in the figures form the subject matter of the invention as such and in any arbitrary combination even independently of the composition thereof in the individual claims or the references thereof. Furthermore, identical reference signs stand for identical or similar objects in the figures.

FIG. 1 shows a panelling part in a schematic three-dimensional illustration.

FIG. 2 shows a possible structure of the panelling part in a sectional view.

DETAILED DESCRIPTION

Figure 3:
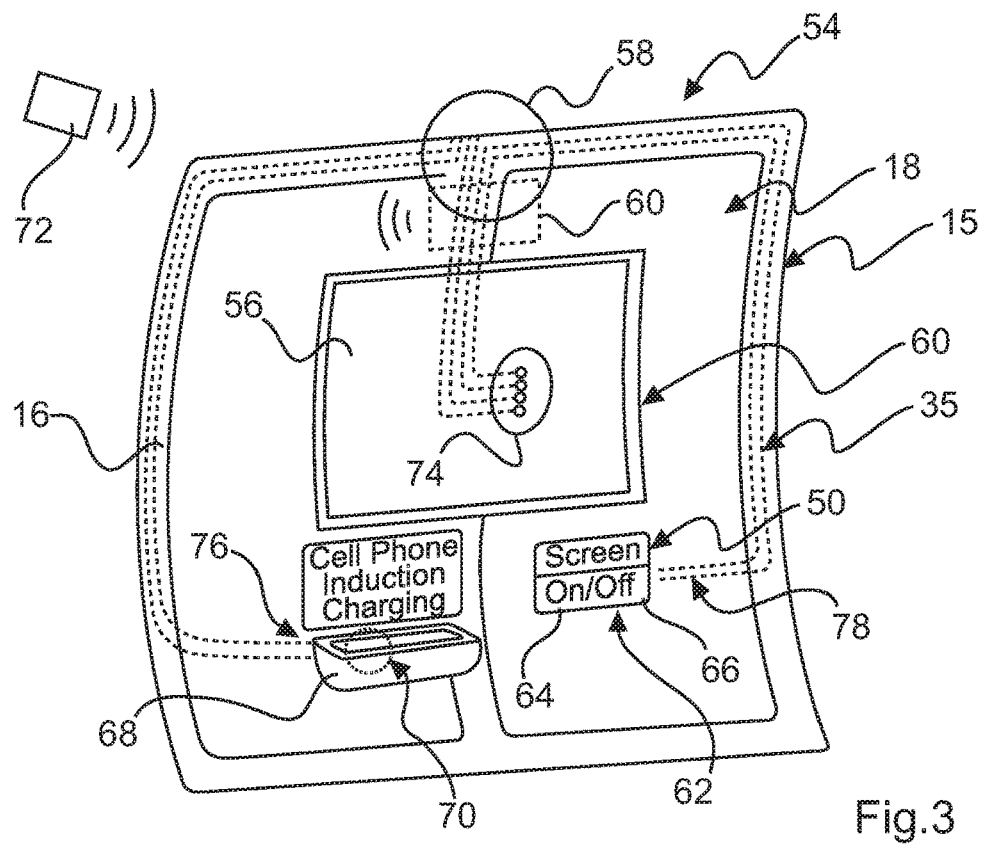
FIGS. 3 and 4 each show an exemplary embodiment of a panelling part.

FIG. 1 shows a panelling part 2 according to the invention for a cabin of a means of transportation. The panelling part 2 comprises a shell-type panelling element 4 having a cabin side 6 and an outer side 8, which is opposite to the cabin side 6. In the case shown, the panelling element 4 is a lateral panelling element, as is usable, for example, in a cabin of a commercial aircraft. The panelling element 4 comprises two window funnels 10, which are tapered toward an aircraft window 12.

A film 14, which is preferably adhesively bonded over the entire area to the panelling element 4, is arranged on the cabin side 6. However, it can also only be fixed in parts. As noted in greater detail hereafter, the film 14 comprises multiple conductor tracks 16, which can be created by imprinting using conductive material, on a side facing toward the panelling element 4. In addition thereto, at least one control unit (not shown here) is provided, which is coupled to the conductor tracks 16. The film 14 is also to be understood as representative of a composite made of multiple films, which are each provided with conductor tracks 16 and/or other electronic components.

A further film 18, which, as a decorative film, is to be considered the outermost surface on the side of the panelling part 2 facing toward a user, is located on the film 14. The decorative film 18 is therefore responsible for the external appearance of the panelling part 2.

A display unit 20, which is also coupled to the conductor tracks 16, is arranged below each of the window funnels 10. By way of example, a temperature display is demonstrated here. The display unit 20 can be implemented in the form of LEDs or a matrix display. The display unit 20 can be integrated into one of the films 14, 18. To be able to see the light emitted by the display unit 20, the decorative film 18 could comprise a correspondingly shaped, completely transparent region or the display unit 20 is provided with a sufficient luminosity.

An interaction unit 22, with the aid of which a user can interact with the panelling part 2 and/or electronic components arranged therein, is arranged between the window funnels 10 and the display unit 20. The user can thus, for example, influence the content of the data displayed on the display unit 20. By way of example, the interaction unit 22 comprises two buttons 24 and 26, which are only used here to change the luminosity of the display unit 20. The two buttons 24 and 26 can be implemented with the aid of capacitive, touch-sensitive sensors on the first film 14. The second film 18 could comprise a corresponding button text or a contour drawing characterizing the buttons 24 and 26. This aligns with the touch-sensitive sensors.

The interaction unit 22 is coupled to the control unit (not shown here). A further interaction unit 28 in the form of two further buttons 30 and 32 can be provided, which is integrated into the display unit 20. The entire display unit 20 could be implemented, for example, with the aid of a touch-sensitive display screen, on which buttons 30 and 32 are symbolically arranged as needed. The buttons 30 and 32 can then interact with the control unit by analysing the sensors located in this region. Of course, the above-mentioned interaction unit 22 could also be implemented in the display unit 20 itself, so that it extends up to a lower edge of the window funnel 10.

FIG. 2 shows a schematic structure of the panelling part 2 in a sectional illustration. The panelling element 4 can comprise a core 34, which is based on a foam or a honeycomb fabric made of plastic. The core 34 is enclosed by an outer cover layer 36 and an inner cover layer 38. In this way, a panelling element 4 having a very low density and nonetheless a high stability can be implemented. Of course, the structure of the panelling element 4 can deviate from this example depending on the intended use and type of the means of transportation.

An adhesive layer 40 can be arranged on the inner cover layer 38, which later faces toward a user. This could actually be embodied in the form of a layer of an adhesive or comprise an adhesive tape or an adhesive film, on which an adhesive is applied. As described above, the adhesive layer 40 could be foam-based, so that slight irregularities are correctable.

A first film 42 adjoins thereon, which can extend over the entire surface of the panelling element 4 and comprises printed-on or separately produced and mounted electronic components. These can in particular comprise a control unit, which is arranged as an integrated circuit on the first film 42.

An electrically insulating layer 44 in the form of a second film can optionally be arranged thereon. The conductor tracks 16 previously shown can adjoin thereon and can follow the electrically insulating layer 44 or the first film 42, respectively, on a side facing away from the panelling element 4. These could be connected, for example, at a connecting section (see hereafter) to the display unit 20 and a peripheral terminal section (see hereafter). Again, an electrically insulating layer 46 can extend over this, which is embodied, for example, as a third film. The electrically insulating layers 42 and 46 additionally do not necessarily have to extend over the entire available surface, but rather can also be arranged solely on sections to be insulated, for example, can extend only on the conductor tracks 16 and laterally somewhat beyond.

A further adhesive layer 48 could extend thereon, which is finally bonded to the decorative film 18, which could represent a fourth film in the composite. The decorative film 18 could be equipped with the interaction unit 22 in that touch-sensitive sensors 50 are arranged on a side of the decorative film 18 facing toward the panelling element 4, while a graphic representation 52 of the interaction unit 22 is provided on an opposing surface.

FIG. 3 shows a further exemplary embodiment of a panelling part 54, which is equipped with a display screen 56 as a display unit instead of a window funnel 10, wherein the display screen 56 extends over a significantly larger area than a window funnel 10. Conductor tracks 16 are indicated by dashed lines, which end in a terminal section 58, which is arranged on the periphery on the panelling part 54. All components which are arranged in the panelling part 54 can be supplied with an electric voltage via this terminal section 58.

By way of example, a control unit 60 is provided, which is coupled to the display screen 56 and is supplied with an electric voltage from the terminal section 58 by the conductor tracks 16. An interaction unit 62, which can control, for example, the switching on and off of the display screen 56, is arranged by way of example below the display screen 56. Buttons 64 and 66 are also provided here, which are coupled to touch-sensitive sensors 50 and can influence the operation of the display screen 56 via the control unit 60.

Furthermore, a charging cradle 68 is provided, which is designed to accommodate mobile terminals. In particular, the charging cradle 68 can be provided with a coil arrangement 70, using which inductive charging of a mobile terminal accommodated by the charging cradle 68 is enabled.

To provide content, the control unit 60 is designed in particular to communicate wirelessly with an external electronics unit 72, which is arranged at another location within the means of transportation. The installation expenditure for the electrical integration of the panelling part 54 is thus restricted to the provision of a sufficient electric voltage. The control unit 60 is equipped with a communication unit, which enables the wireless communication.

As is apparent on the basis of the exemplary embodiment, an array of symbols, graphics, or the like can be arranged on the decorative film 18, which give the user a notification of a usage of the various functions or mark the buttons 64 and 66 accordingly. For example, a printed notification is located above the charging cradle 68 that an inductive charging device is concealed here.

Connecting sections 74, 76, and 78, in which the conductor tracks 16 end, are provided for coupling electronic components which are arranged on the panelling part 54. In particular the first-mentioned connecting section 74 is used for coupling a larger electronic device in the form of the display screen 56. The films can be used for coupling an external electronic device, which is separately embodied and is fastened on the panelling part 54. The display screen 56 could be included therein. Alternatively thereto, a film from the composite shown in FIG. 2 can also permit a connection to an electronic device of another film of the composite via such a connecting section.

Figure 4:
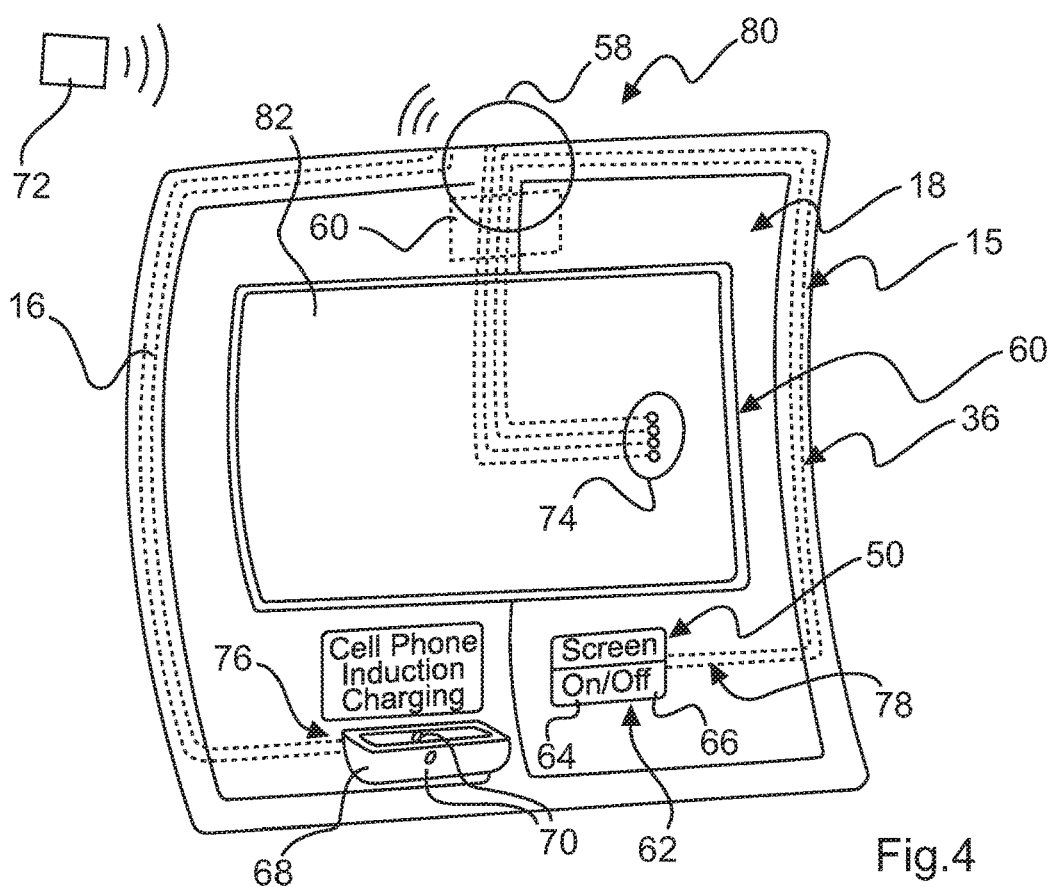

FIG. 4 shows a somewhat modified exemplary embodiment in the form of a panelling part 80. A display screen 82 is provided here, which extends over a larger area than the display screen 56 in FIG. 3. All further features remain practically unchanged. It can prove to be advantageous to implement such large display screens 82 by way of a film construction as well. The manufacturing and attachment of an external display screen could result in a relatively high weight in particular upon use in an aircraft. The use of a flexible matrix display which is based on a film additionally permits a perfect adaptation to the shape of the panelling element 4.

Figure 5A:
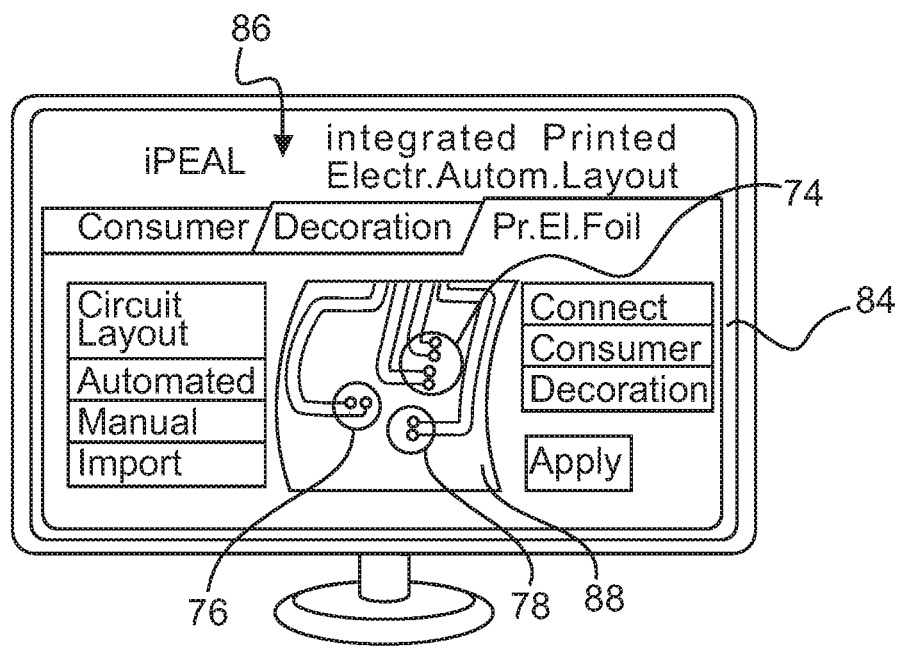
FIGS. 5a and 5b show a computer unit for designing a film layout.
Figure 5B:
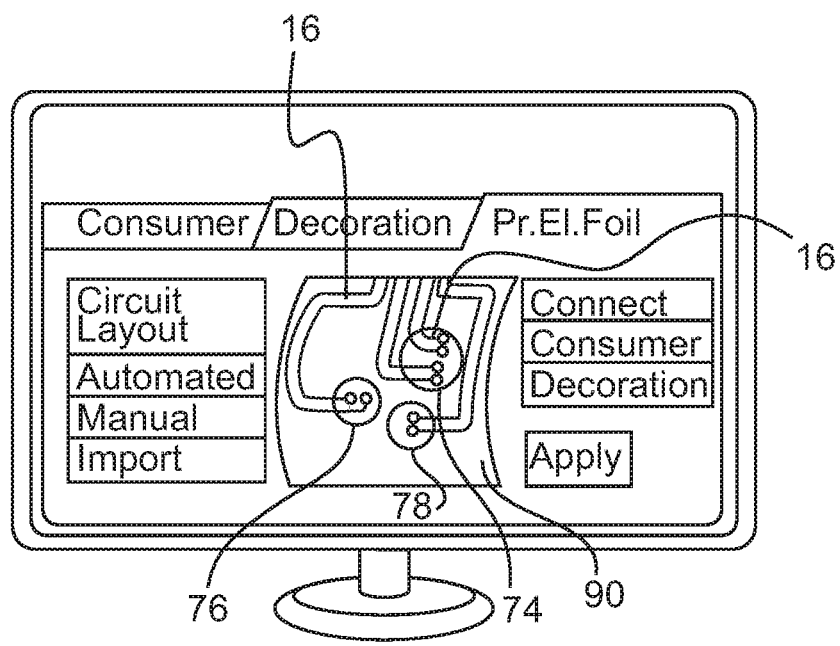

FIGS. 5*a* and 5*b* show a further aspect of the invention. As described above, a particular advantage of the invention can be considered to be that a flexible and in particular rapid implementation of functions can be enabled in that large-area films made of the composite shown in FIG. 2 are to be produced fully automatically. Software can be used for this purpose, with the aid of which boundary conditions can be specified, which comprise, for example, the size of the panelling element, the desired functions, the desired size of the display units, and also number, functions, and positions of the interaction units. A layout can be automatically generated therefrom, which can be used for fully automatic printing and equipping by means of printing devices and equipping robots. Thus, in particular in quite a late stage of the planning of the production of a means of transportation, extensive changes can also be performed, which are nonetheless rapidly implementable and do not result in high planning costs.

FIGS. 5*a* and 5*b* each show, for example, a computer unit 84, which executes software having a user interface 86. Different layouts 88 and 90 of at least one film having conductor tracks 16 are shown therein, in which display screens of different sizes are used. FIG. 5*a* approximately corresponds to the exemplary embodiment in FIG. 3, while FIG. 5*b* corresponds to the exemplary embodiment in FIG. 4. The individual films can be printed and attached to the panelling elements 4 only days before the final installation of the panelling parts 54 and/or 80.

Figure 6:
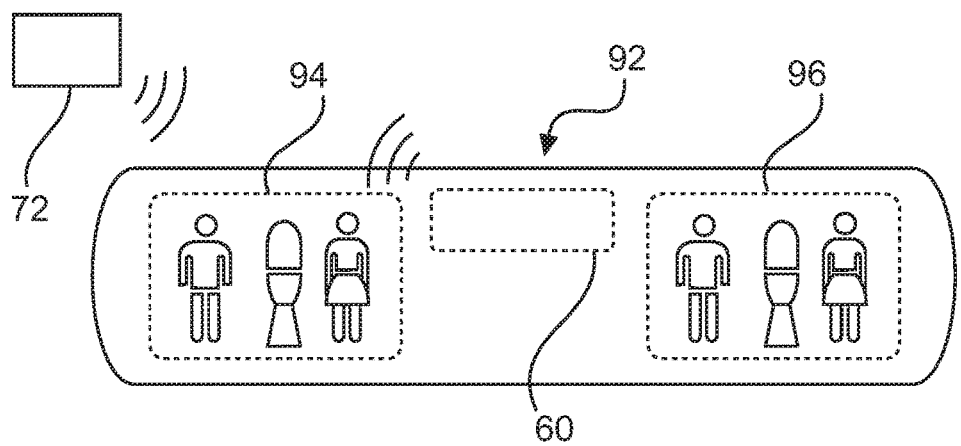
FIG. 6 shows a further exemplary embodiment in the form of a paneling, which is an inner paneling part.

FIG. 6 shows a further exemplary embodiment in the form of a panelling part 92, which is an inner panelling part. A first display unit 94 and a second display unit 96 are provided here, which can display a status of onboard toilets. Attaching a decorative film having the corresponding signals and arranging multiple light-emitting diodes, for example, in the form of a matrix, on a film located behind is conceivable in this arrangement. A control unit 60 is coupled to the light-emitting diodes and an external electronics unit 72 and can activate the display unit 94 or 96 depending on the transmitted status of the onboard toilets. The panelling part 92 can have a very small structural depth and a very low weight due to the integrated components. It is conceivable to retrofit such a panelling part 92 easily in order to be able to use its advantages in an already existing cabin.

Figure 7:
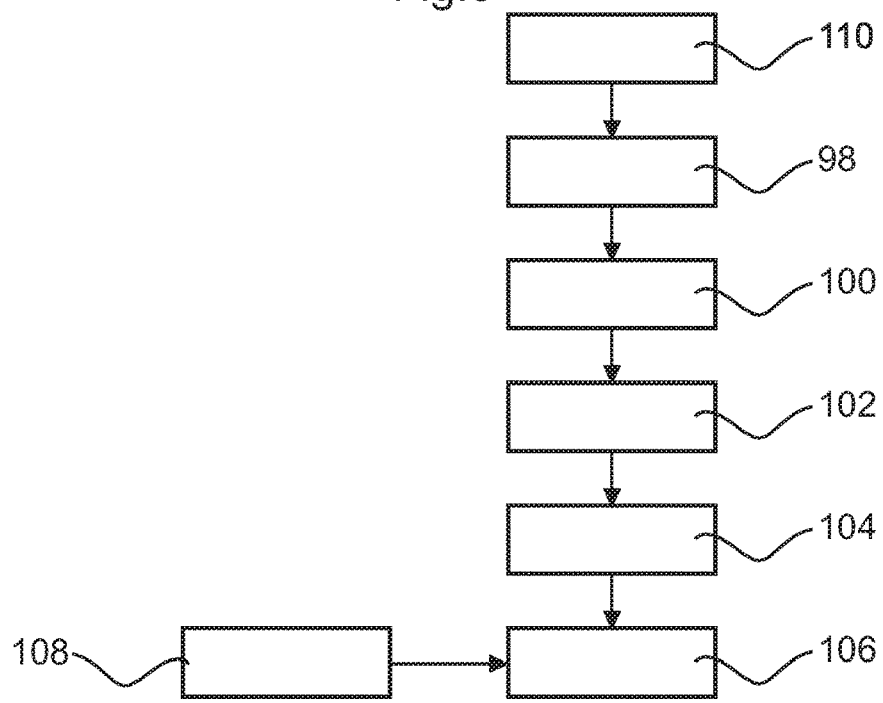
FIG. 7 shows a flow chart of a method according to an aspect of the invention for producing a panelling part.

FIG. 7 shows a schematic illustration of a method according to the invention for producing a panelling part as described above. The method can firstly comprise the provision 98 of the shell-type panelling element, the provision 100 of the at least one film, the printing 102 of the at least one film with conductor tracks to form a peripheral terminal section and at least one connecting section, the equipping 104 of the at least one film at least with the at least one control unit, which is coupled to the conductor tracks, and the attaching 106 of the at least one film to the cabin side of the panelling element. The method can furthermore comprise the equipping 108 of the at least one film with at least one interaction unit, which is coupled to at least one control unit. As described above, the method can furthermore comprise the preparatory step 110 of the automated design of a course of the conductor tracks and the location of the at least one connecting section with the aid of a computer unit.

Figure 8:
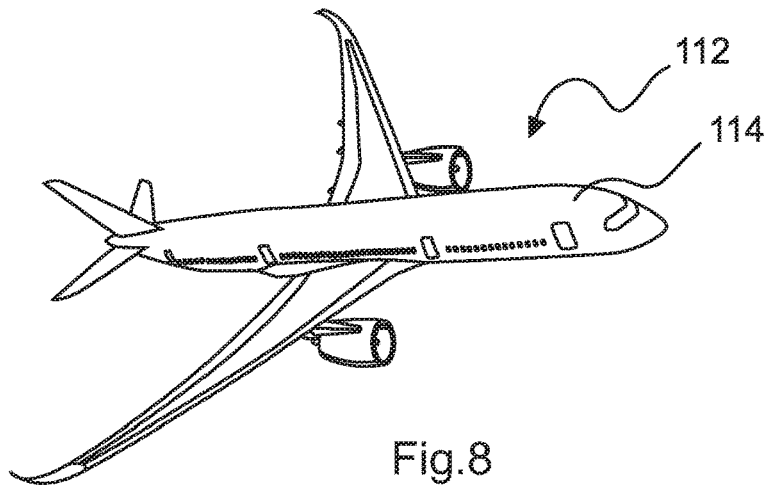
FIG. 8 finally shows an aircraft, in which at least one panelling part is arranged.

Finally, FIG. 8 shows an aircraft 112 having a passenger cabin 114, in which cabin panelling is arranged. This can comprise in particular at least one above-mentioned panelling part 2, 54, 80, or 92.

In addition, it is to be noted that "comprising" does not preclude other elements or steps and "a" or "one" does not exclude a plurality. Furthermore, it is to be noted that features which have been described with reference to one of the above exemplary embodiments can also be used in combination with other features of other above-described exemplary embodiments. Reference signs in the claims are not to be understood as a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 2 panelling part
4 panelling element
6 cabin side
8 outer side
10 window funnel
12 aircraft window
14 film
16 conductor track
18 film/decorative film
20 display unit
22 interaction unit
24 button
26 button
28 interaction unit
30 button
32 button
34 core
36 outer cover layer
38 inner cover layer
40 adhesive layer
42 first film
44 electrically insulating layer/second film
46 electrically insulating layer/third film
48 adhesive layer
50 touch-sensitive sensor
52 graphic representation
54 panelling part
56 display screen
58 terminal section
60 control unit
62 interaction unit
64 button
66 button
68 charging cradle
70 coil arrangement
72 electronics unit 74 connecting section
76 connecting section
78 connecting section
80 panelling part
82 display screen
84 computer unit
86 user interface
88 layout
90 layout
92 panelling part (inner panelling part)
94 display unit
96 display unit
98 provision of the shell-type panelling element
100 provision of the at least one film
102 printing of the at least one film
104 equipping of the at least one film
106 attaching of the at least one film
108 equipping of the at least one film
110 automated design
112 aircraft
114 passenger cabin

The invention claimed is:

1. A panelling part for a cabin of a means of transportation, comprising:
a shell-type panelling element having a cabin side and an outer side;
at least one display unit;
at least one film; and
at least one control unit,
wherein the at least one display unit is arranged on the panelling element and is configured to display items of image information to a user facing toward the panelling part,
wherein the at least one film is fastened on the cabin side,
wherein the at least one film comprises conductor tracks, extending from a peripheral terminal section of the at least one film to at least one connecting section, at which a power terminal of the at least one display unit is connected to the conductor tracks,
wherein the at least one control unit is fastened on the at least one film, is coupled at least to the at least one display unit, and is configured to communicate wirelessly with an electronics unit located outside the panelling element and to provide items of image information for display on the at least one display unit.

2. The panelling part according to claim 1,
further comprising at least one interaction unit coupled to the at least one control unit,
wherein the interaction unit is arranged on the panelling element and is configured to record inputs of a user facing toward the panelling part, and
wherein the at least one control unit is configured to provide the items of image information in dependence on inputs of the interaction unit.

3. The panelling part according to claim 2,
wherein the at least one film comprises a decorative film, arranged as the outermost layer on the panelling part, and
wherein one or more symbols or markings are arranged on the decorative film, which align with the respective interaction unit, for the at least one interaction unit.

4. The panelling part according to claim 1, wherein the panelling element is an at least regionally curved lateral panelling element for panelling a lateral surface of the cabin.

5. The panelling part according to claim 4, wherein the at least one display unit comprises a matrix display for replacing a cabin window.

6. The panelling part according to claim 1, wherein the conductor tracks and the at least one control unit are arranged on a side of the at least one film facing toward the panelling element.

7. The panelling part according to claim 1, wherein the at least one film comprises a decorative film, arranged as the outermost layer on the panelling part.

8. The panelling part according to claim 1,
wherein the panelling element is an inner wall panelling element, and
wherein the at least one display unit comprises a status display for at least one onboard toilet.

9. The panelling unit according to claim 1, wherein the at least one display unit comprises at least one light-emitting diode arranged on the at least one film.

10. The panelling part according to claim 1,
further comprising a charging cradle for accommodating mobile terminals,
wherein the charging cradle is configured to carry out an electrical coupling with the accommodated mobile terminal.

11. A method for producing a panelling part comprising a shell-type panelling element having a cabin side and an outer side; at least one display unit; at least one film; and at least one control unit, wherein the at least one display unit is arranged on the panelling element and is configured to display items of image information to a user facing toward the panelling part, wherein the at least one film is fastened on the cabin side, wherein the at least one film comprises conductor tracks, extending from a peripheral terminal section of the at least one film to at least one connecting section, at which a power terminal of the at least one display unit is connected to the conductor tracks, wherein the at least one control unit is fastened on the at least one film, is coupled at least to the at least one display unit, and is configured to communicate wirelessly with an electronics unit located outside the panelling element and to provide items of image information for display on the at least one display unit, the method comprising:
providing the shell-type panelling element;
providing the at least one film;
printing the at least one film using conductor tracks to form a peripheral terminal section and at least one connecting section;
equipping the at least one film at least with the at least one control unit coupled to the conductor tracks; and
attaching the at least one film to the cabin side of the panelling element.

12. The method according to claim 11, further comprising the equipping of the at least one film with at least one interaction unit, coupled to the at least one control unit.

13. The method according to claim 11, further comprising a preparatory step of an automated design of a course of the conductor tracks and of the location of the at least one connecting section with the aid of a computer unit.

14. A means of transportation, comprising:
a passenger cabin, provided with a cabin panelling, wherein the cabin panelling comprises at least one panelling part comprising:
a shell-type panelling element having a cabin side and an outer side;
at least one display unit;
at least one film; and
at least one control unit, wherein the at least one display unit is arranged on the panelling element and is configured to display items of image information to a user facing toward the panelling part, wherein the at least one film is fastened on the cabin side,
wherein the at least one film comprises conductor tracks, extending from a peripheral terminal section of the at least one film to at least one connecting section, at which a power terminal of the at least one display unit is connected to the conductor tracks,
wherein the at least one control unit is fastened on the at least one film, is coupled at least to the at least one display unit, and is configured to communicate wirelessly with an electronics unit located outside the panelling element and to provide items of image information for display on the at least one display unit.

15. The means of transportation according to claim 14, wherein the means of transportation is an aircraft.

* * * * *